United States Patent [19]

Pisaric et al.

[11] 4,302,550

[45] Nov. 24, 1981

[54] PROCESS AND APPARATUS FOR THE MIXING AND APPLICATION OF REACTIVE MATERIALS

[75] Inventors: Karl H. Pisaric, Pulheim; Karl-Arnold Weber; Harro Träubel, both of Leverkusen; Dieter Brauner, Solingen; Manfred H. Pahl, Dormagen, all of Fed. Rep. of Germany

[73] Assignee: Bayer Aktiengesellschaft, Leverkusen, Fed. Rep. of Germany

[21] Appl. No.: 145,205

[22] Filed: Apr. 29, 1980

Related U.S. Application Data

[62] Division of Ser. No. 950,352, Oct. 11, 1978.

[30] Foreign Application Priority Data

Oct. 14, 1977 [DE] Fed. Rep. of Germany ....... 2746188

[51] Int. Cl.$^3$ ................. C08G 18/14; C08G 18/32
[52] U.S. Cl. ................. 521/133; 521/917; 156/78; 156/289; 156/344; 366/101; 366/165; 366/336; 366/337; 422/133; 422/135; 422/225
[58] Field of Search ................. 521/917, 133

[56] References Cited

U.S. PATENT DOCUMENTS

| | | | |
|---|---|---|---|
| Re. 24,514 | 8/1958 | Hoppe et al. | 521/917 |
| 2,043,108 | 5/1936 | Maurer | 366/165 |
| 2,957,203 | 10/1960 | Marshall | 521/917 |
| 3,245,661 | 4/1966 | Breer | 521/917 |
| 3,286,992 | 11/1966 | Armeniades et al. | 259/4 |
| 3,434,805 | 3/1969 | Bar | 521/917 |
| 3,462,083 | 8/1969 | Kautz | 521/917 |
| 3,475,266 | 10/1969 | Strassel | 528/44 |
| 3,862,907 | 1/1975 | Shimotsuma et al. | 48/180 M |
| 3,883,121 | 5/1975 | Guillaud | 259/4 |
| 3,923,202 | 12/1975 | Riccio | 222/145 |
| 3,924,837 | 12/1975 | Knis | 422/135 |
| 3,924,989 | 12/1975 | Althausen et al. | 425/130 |
| 3,941,355 | 3/1976 | Simpson | 366/336 |
| 3,982,668 | 9/1976 | Riccio | 222/95 |
| 4,019,719 | 4/1977 | Schuster et al. | 259/4 AB |
| 4,049,197 | 9/1977 | Brower | 239/218.5 |
| 4,050,896 | 9/1977 | Raffel et al. | 23/230 A |
| 4,053,283 | 10/1977 | Schneider et al. | 23/252 R |
| 4,068,830 | 1/1978 | Gray | 366/174 |
| 4,137,048 | 1/1979 | Steinman | 422/135 |

FOREIGN PATENT DOCUMENTS

| | | |
|---|---|---|
| 834184 | 4/1976 | Belgium . |
| 1694151 | 7/1971 | Fed. Rep. of Germany . |
| 2035485 | 1/1972 | Fed. Rep. of Germany . |
| 2211055 | 9/1973 | Fed. Rep. of Germany . |
| 2216871 | 10/1973 | Fed. Rep. of Germany . |
| 2245082 | 3/1974 | Fed. Rep. of Germany . |
| 2349433 | 4/1975 | Fed. Rep. of Germany . |
| 2522106 | 11/1976 | Fed. Rep. of Germany . |
| 2530018 | 1/1977 | Fed. Rep. of Germany . |
| 1206746 | 9/1970 | United Kingdom . |
| 1313182 | 4/1973 | United Kingdom . |
| 1381556 | 1/1975 | United Kingdom . |
| 1405020 | 9/1975 | United Kingdom . |
| 1538170 | 1/1979 | United Kingdom . |

OTHER PUBLICATIONS

Condensed Chemical Dictionary, 8th Edition, Van Nostrand Reinhold, N.Y. p. 930.
Hackh's Chemical Dictionary, 4th Edition, McGraw-Hill, N.Y., p. 713.

*Primary Examiner*—H. S. Cockeram
*Attorney, Agent, or Firm*—Gene Harsh; Lawrence S. Pope

[57] ABSTRACT

The invention disclosed herein is concerned with a process for mixing a plurality of viscous rapidly reacting, fluid materials and an apparatus with which to perform this process. In this process the fluid materials are initially introduced into a mixing chamber and mixed with a gas, preferably in such a way that an angular momentum is imparted to the mixture. The mixture is then fed into a static mixer which has a short residence time spectrum. The apparatus comprises a cylindrical mixing chamber with a gas inlet and at least one nongaseous fluid material inlet arranged to direct flow tangentially to the interior surface of the mixing chamber. Other inlets may be provided downstream of these initial inlets but before a static mixer with which said mixing chamber communicates. An outlet is provided downstream of said static mixer which preferably has intersecting baffle plates, a low pressure loss and a short residence time spectrum.

11 Claims, 3 Drawing Figures

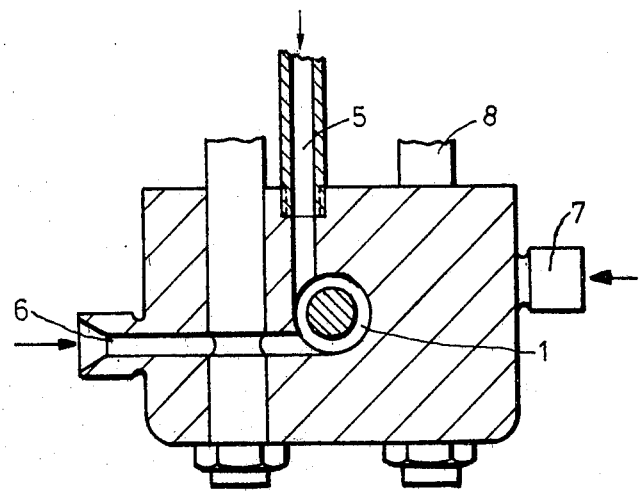
FIG. 2 (A-B)
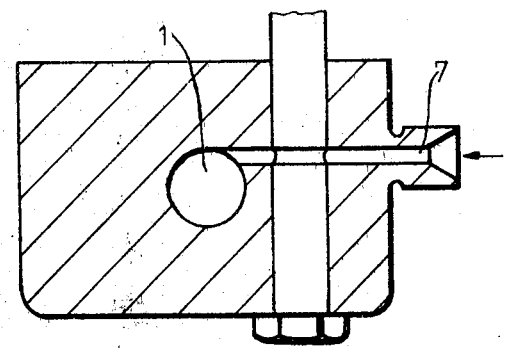
FIG. 3 (C-D)

PROCESS AND APPARATUS FOR THE MIXING AND APPLICATION OF REACTIVE MATERIALS

This is a division of application Ser. No. 950,352 filed Oct. 11, 1978.

FIELD OF THE INVENTION

The invention relates to a method of mixing a plurality of viscous, rapidly reacting, fluid materials in two stages and an apparatus for carrying out the method.

BACKGROUND OF THE INVENTION

Apparatus for mixing and applying reactive flowable materials, for example polyurethane starting compounds, in reverse coating, are known. In one design a high-towered pronged stirrer is fitted into the mixing chamber. This apparatus is very prone to breakdown. The seal of the material bush usually starts leaking after only one to three hours, product escapes and the mixing ratio changes, thus impairing the quality of the product. Another known apparatus makes use of a complicated rotor with distributing shovels (German Offenlegungsschrift No. 2,530,018).

If a hot product is also to be processed, then, owing to the different expansion in heat, the problems of sealing can no longer be solved.

Stirrers of the types described for example in German Offenlegungsschriften Nos. 2,451,367 (U.S. Pat. Nos. 3,923,202 and 3,982,668) or 2,645,876 (U.S. Pat. No. 4,049,197) or in German Auslegeschriften Nos. 2,530,018 or 2,035,485 are unsuitable for this purpose.

External mixing nozzles, whirl chambers, counter-flow injectors and static mixers are types of mixing apparatus without moving parts.

With external mixing nozzles, the material to be mixed is not sufficient (German Offenlegungsschrift No. 1,570,524 and U.S. Pat. No. 3,475,266).

With whirl chamber mixing (for example German Offenlegungsschrift No. 2,262,739 and U.S. Pat. No. 3,862,907) it is not possible to obtain lasting, large amounts of material to be mixed with media having very different viscosities, since the material to be mixed is greatly impaired by deposits in the chamber. A very large amount of air is used up, bubbles are difficult to avoid in the surface layer and losses through overspraying impair the economic viability.

With mixing according to the counter-flow injection principle (German Offenlegungsschrift No. 1,694,151), high pressures are needed and complicated designs are required. This method is particularly disadvantageous when high-viscosity and low-viscosity media are processed together.

If only a static mixer (German Auslegeschrift No. 1,557,118 or German Offenlegungsschrift No. 2,525,020, U.S. Pat. No. 4,019,719) is used, the mixing chamber has to be made relatively long. The residence time, therefore, becomes too great for rapidly reacting components. The same applies to a valve for mixing two flowing agents of differing viscosity (German Auslegeschrift No. 2,216,871).

An object of the invention is to develop a method and an apparatus for mixing and applying rapidly reacting materials with large differences in viscosity, and possibly differences in temperature, which is distinguished by good reliability of operation.

SUMMARY OF THE INVENTION

According to the present invention, there is provided a method of mixing a plurality of viscous, rapidly reacting fluid materials in two stages, wherein the materials are introduced into a preliminary mixing chamber and premixed with a gas and this mixture of gas and liquid is fed directly after being formed to a short static mixing apparatus which has a short residence time spectrum.

The invention further provides an apparatus for carrying out the method, comprising a cylindrical mixing chamber having a plurality of inlet portions for the admission of the viscous, rapidly reacting, fluid materials and at least one gas inlet portion, and an outlet opening at the downstream end of the mixing chamber, wherein at least one of said plurality of inlet portions and said at least one gas inlet portions are arranged so that the fluid material and the gas flow approximately tangentially from the casing surface of the mixing chamber into the mixing chamber, and those remaining said plurality of inlet portions are offset downstream of the mixing chamber, and a static mixing apparatus is provided between said inlet portions and said outlet opening.

DETAILED DESCRIPTION OF THE INVENTION

Very thorough mixing of the reaction components as well as a narrow residence time range are achieved in the mixing chamber by the method according to the invention. The mixture is prevented from settling by the angular momentum. The angular momentum is obtained primarily by the tangential introduction of the gas. The first component of the reaction mixture is preferably also introduced tangentially so as to assist the angular momentum. The amount of gas can be increased until intensive turbulence occurs. The other one or more reacting components are added through inlet positions arranged further downstream. This prevents the entry of the first component into the mixing chamber from being disturbed or hindered by a reaction of the other one or more components with the first component. The other one or more components are preferably supplied in such a way that the angular momentum is increased. It has however been found that radial supply of the other one or more components leads to satisfactory preliminary mixing. The material in the vicinity of the gas feed pipes which contributes most to the quantitative rate of flow is preferably introduced as the first component. For example, when coating with polyurethane starting materials, the NCO prepolymer would be introduced as first component, and the cross-linking component, for example polyamines, would be added downstream.

If the gas supplied has the task only on increasing the rate of flow and of initiating turbulence in the mixture, an inert gas, preferably air, is used. In addition to this function, it can however also participate in the reaction, for example contain constituents, which are constituents of the formulation, for example blowing gas, or enter the reaction chemically.

With the method according to the invention, it is possible to delay the supply of the cross-linking agent in time by adjusting valves during start-up operation. During shut-down operation the addition of the cross-linking agent stops before the prepolymer supply will be interrupted. Undesirable deposits of product in the injector head can thus be substantially avoided and uninterrupted long-term operation is ensured.

The gas inlet openings may also be used upon completion of the injecting process for introducing a mixture of solvent and gas into the mixing chamber. The mixing chamber is thoroughly cleaned owing to the turbulence. With the method according to the invention, it is possible to process systems which react in very short periods (within a few seconds). The narrow residence time range helps to prevent the mixer from clogging. As a particular advantage, it should be mentioned that materials of different viscosity may be mixed very well and rapidly. The high-viscosity materials can have a viscosity above about 1000 mPas, preferably about 2000 to 10,000 mPas at 20° C. The polyesters which are particularly suitable for high-quality coatings can therefore be used as polyurethane starting materials instead of the polyethers having the same molecular weight. The viscosity of the chain extenders is considerably lower, preferably below about 50 mPas. In the method according to the invention, it is immaterial whether the amounts of materials to be mixed together are approximately equal or differ substantially from each other. In both cases, the amount of material to be mixed is very large.

A material is occasionally heated to reduce the viscosity. Of course, this causes an increase in the reaction velocity. In the method according to the invention, materials of different temperature can be mixed without substantial difficulty, problems of sealing do not arise and the increase in the reaction velocity is not troublesome owing to the short residence time and the narrow residence time range.

It is beneficial for the twisting flow to be distributed into several partial streams by a shearing element before it enters the static mixing apparatus. The shearing element can be a constituent of the static mixer fitted into the mixing chamber downstream. Thorough mixing for a short average residence time, a narrow residence time spectrum, a small drop in pressure and good means of cleaning are generally demanded of the static mixing apparatus. A static mixing apparatus of the type described, for example in German Offenlegungsschrift No. 2,522,106, satisfies the conditions just mentioned.

An embodiment of an apparatus according to the invention is shown in the accompanying drawings, in which FIGS. 1 to 3 show sections through a mixing apparatus.

BRIEF DESCRIPTION OF THE DRAWINGS

FIG. 2 is a cross section of the apparatus of FIG. 1 along line A,B perpendicular to the long axis.

FIG. 3 is a cross section of the apparatus of FIG. 1 along line C,D perpendicular to the long axis.

A mixing chamber is used for processing rapidly reacting mixtures of two materials. The two reactants and air are fed into the mixing chamber 1 via valves 2, 3, 4 and inlet openings 5, 6, 7 respectively. FIGS. 2 and 3 show that the inlet openings 6, 7 are arranged in such a way that a turbulent twisting disturbance is produced in the mixing chamber 1. A conical sealing bolt 8 is provided on the upper section of the mixing chamber 1 and strengthens the twisting stream. It can easily be removed during the cleaning process. Solvent with or without air may be introduced for cleaning purposes through another feed pipe 9, which is blockable by means of a valve 10. The valves 2, 3 are controlled by means of a linkage 11. In this example, it is arranged in such a way that the valve 2 opens before 3 and during shut-down operation is closed as the last of the two. This step-by-step operation avoids plugging of the inlet openings 5, 6 and 7. The lower section of the mixing chamber 1 contains a shearing element 12 which has the form of a criss-cross grid. A static mixer 13 with several intersecting baffle plates is suitable for mixing products having a larger viscosity difference rapidly with a small drop in pressure and narrow residence time spectrum. In the example, the static mixer 13 has a diameter of $2 \times 10^{-2}$ m and a length of $7 \times 10^{-2}$ m. The mixing chamber 1 is limited by a perforated sealing screw 14. An atomization nozzle 15 is joined to the sealing screw 14.

Figure 1:
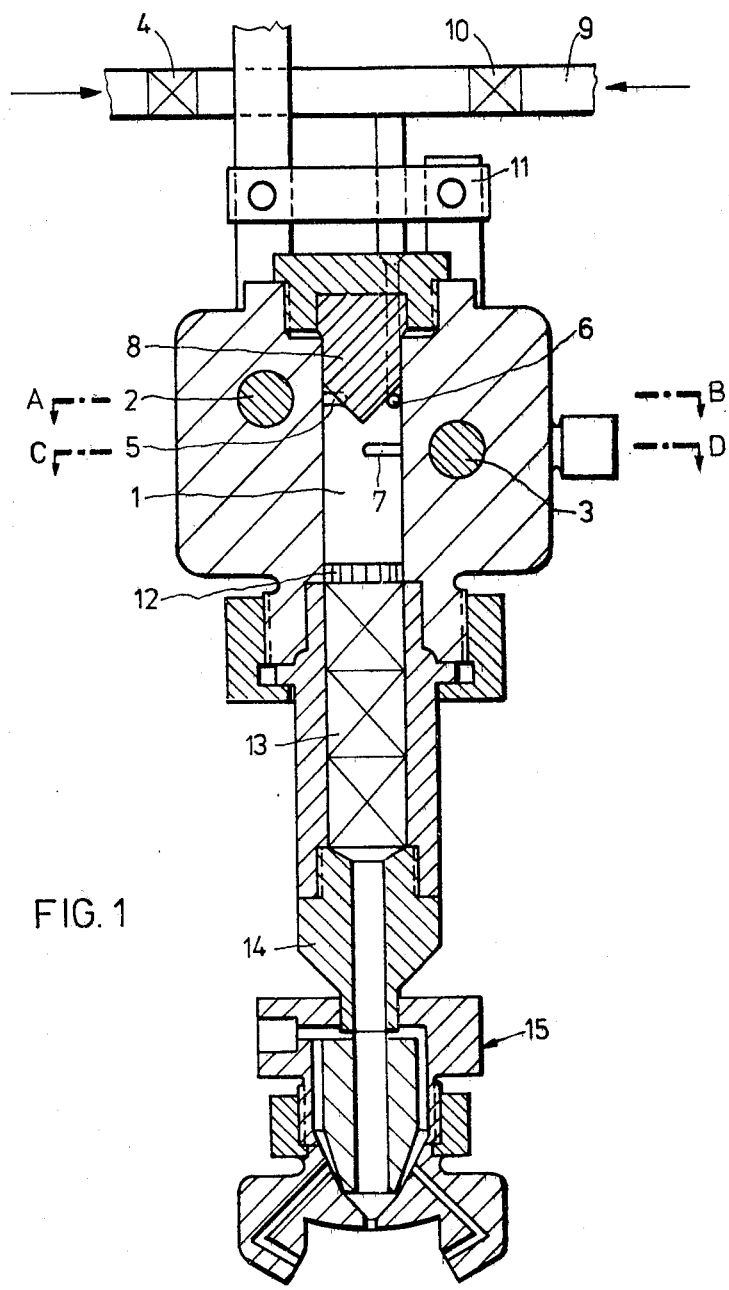
FIG. 1 is a cross section of an embodiment of the present invention parallel to its long axis.

Leather or other substrates may be coated using little solvent with polyurethanes in a direct reverse process using the apparatus described in this example. The visual appearance is excellent. The mixing apparatus operates for several days without interruption.

A coating method of this type may be carried out, for example, as follows.

An isocyanate prepolymer and a cross-linking agent, for example a polyamine, optionally dissolved in organic solvents, are conveyed via metering pumps into a mixer head and mixed (cf. H. Träubel, Leder (1974), 162/166; J. Coated Fabrics, (1975), 10, 114/123). The reacting mixture obtained can be discharged and distributed on a substrate by spraying.

NCO prepolymers include compounds containing isocyanate groups in the widest sense, such as oligomeric compounds containing diisocyanates and polyisocyanates in monomeric form or urethane or urea groups.

Cross-linking agents include compounds with at least two hydrogen atoms capable of reacting with isocyanates, including water, for example polyhydroxy and polyamino compounds of low and relatively high or high molecular weight. Suitable substrates include, for example, leather and materials made of natural and/or synthetic fibers such as fleeces, fabrics, knitted fabric and paper.

EXAMPLES

EXAMPLE 1

In order to carry out polyurethane reactive coating, an 80% by weight solution of the polyester prepolymer in toluene with NCO terminal groups and an NCO content of 3.2% by weight (based on the solution), which has been heated to a temperature of 60° C. and has a viscosity of 600 mPas, is introduced into the apparatus according to the invention through the opening 6 at a delivery rate of $8.33 \times 10^{-3}$ kgs$^{-1}$. $2.23 \times 10^{-3}$ kgs$^{-1}$ of a hardener solution at room temperature having the following composition:

| |
|---|
| 0.200 kg toluylene diamine |
| 0.800 kg methyl ethyl ketone |
| 0.200 kg carbon black grind for coloring |
| 0.050 kg silicone oil as flowing agent |
| 1.250 kg | and having a viscosity below 50 mPas are fed through the opening 7 into the mixing chamber.

Air at a pressure of $3 \times 10^5$ Nm$^{-2}$ is introduced through the opening 5. Once the components in the preliminary mixing chamber have been mixed in the shearing section and the static mixers, the mixture formed is atomized with compressed air at $3 \times 10^5$ Nm$^{-2}$ with air atomization as it leaves the apparatus and is applied directly on to a glass plate. Application is performed by fixing the mixing apparatus on to a traversing slide whose direction of movement runs perpendicularly to a conveyor belt which is located below it and is moved forward uniformly with the traversing movment of the apparatus. This manner of coating substrates of any type is described, for example, in Leder (1974), 162/166.

The glass plate is coated with a completely homogeneous film. The homogeneousness may be proven optically by inspection and mechanically by the uniform tensile strength.

EXAMPLE 2

The test according to Example 1 is repeated only with the difference that mixing air is not introduced through the opening 5. Examination of the film produced on the glass plate shows that the mixing of the components is clearly worse than in the film produced according to Example 1, recognizable, among other things, by streaks.

EXAMPLE 3

The test according to claim 1 is repeated with the difference that the mixture is applied according to the principle of the reverse coating process to a silicone matrix whose surface has the negative formation of a leather grain and with the difference that a leather skiver is coated on to the still pasty composition. After passing through a drying and heating section which is heated to 85° C. (minimum) and after a total residence time of 5 minutes, the leather skiver with the polyurethane coating is separated from the matrix.

The leather skiver is provided with a completely homogeneous polyurethane coating which reproduces the positive of the original leather grain.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of mixing a plurality of viscous, rapidly reacting non-gaseous fluid materials in two stages comprising
    (1) introducing the materials and a gas into a preliminary mixing chamber in such a manner that an angular momentum is imparted to this mixture of gas and liquid, said manner including the introduction of the gas tangentially to the mixing chamber; and then
    (2) feeding said mixture into a short static mixing apparatus which has a narrow residence time spectrum, a small pressure drop, and a short residence time thereby destroying the angular momentum of said mixture, said static mixing apparatus optionally including an interpolated shearing apparatus between the preliminary mixing chamber and the main body of the static mixing apparatus to effect said momentum destruction.

2. A method as claimed in claim 1, wherein the materials have greatly differing viscosities.

3. A method as claimed in claim 1, wherein the materials are at different temperatures.

4. A method as claimed in claim 1, wherein the gas is an inert gas.

5. A method as claimed in claim 4, wherein the gas is air.

6. The method of claim 1 wherein isocyanate prepolymers chain extenders, and gas are introduced tangentially with the points of introduction spaced along the direction of flow of the mixture in the preliminary mixing chamber, the mixture being formed being finely mixed by means of the static mixer with intersecting baffle plates, the mixture thus formed being atomized and applied onto flexible substrates by the direct or reverse method, upon which substrates an elastomeric polyurethane is formed.

7. A method as claimed in claim 6, wherein the chain extenders are polyamino compounds.

8. A method as claimed in claim 7 wherein the mixture formed is atomized with air atomization.

9. The method of claim 1 wherein at least a portion of said gas is retained in the final mixture obtained.

10. The method of claim 1 wherein one of the materials to be mixed is introduced upstream from the point of introduction of any of the other materials.

11. The method of claim 10 wherein the material introduced upstream contributes most to the quantitative rate of flow.